Patented Aug. 7, 1928.

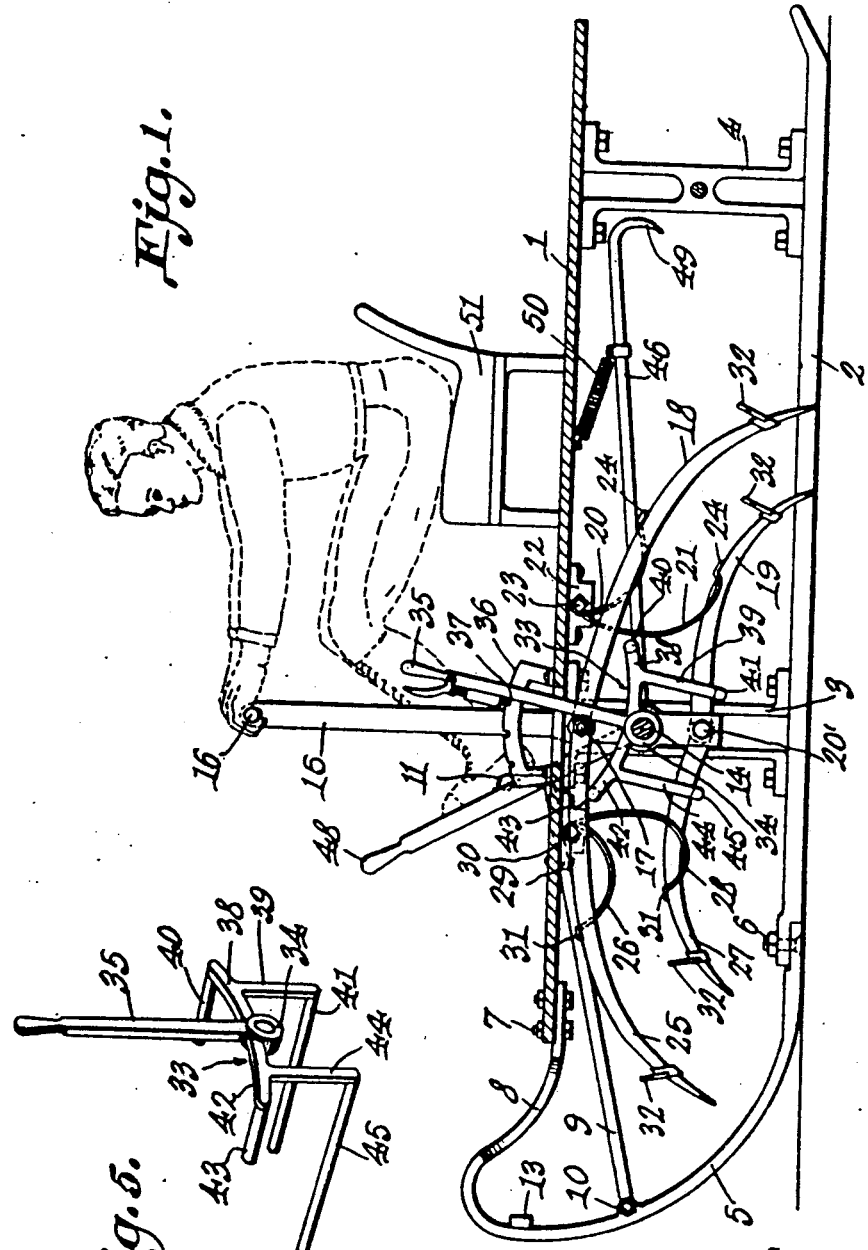

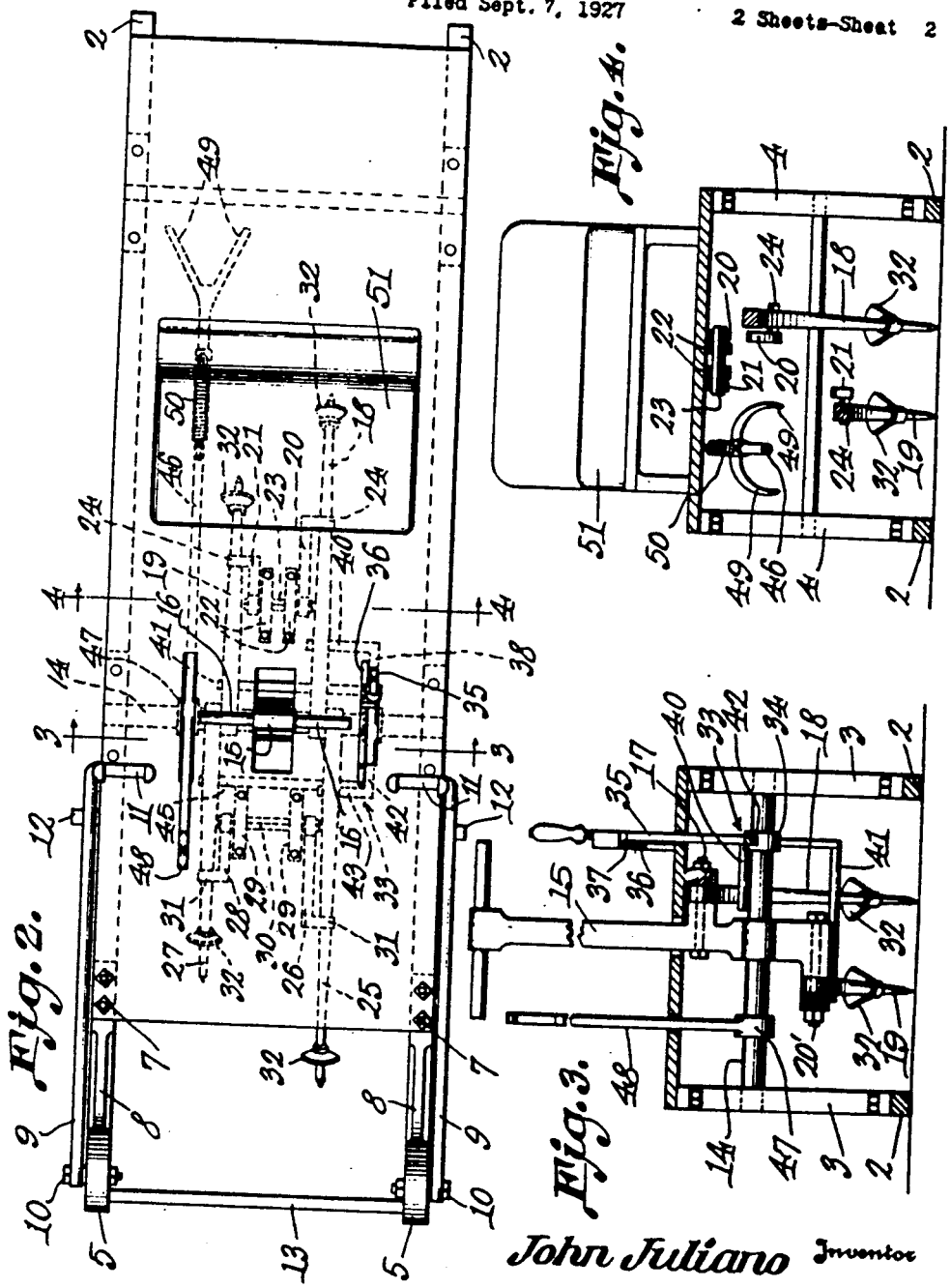

1,679,975

UNITED STATES PATENT OFFICE.

JOHN JULIANO, OF NIAGARA FALLS, NEW YORK.

SLED.

Application filed September 7, 1927. Serial No. 218,076.

This invention relates to sleds and more particularly to that class which is propelled by an occupant.

An object of the invention is to provide means whereby a sled may be propelled over snow or ice in a forward or reverse direction.

Another object of the invention is to provide a suitable brake for checking the motion of the sled.

A further object of the invention is to provide a steering means for the safe operation thereof.

A still further object of the invention is to provide means whereby one set of propellers is raised to an inoperative position while the other set is lowered to an operative position at the will of the operator.

Other objects and advantages of the invention will be apparent during the course of the following description.

In the accompanying drawings, forming a part of this specification, and in which like numerals are employed to designate like parts throughout the same.

Figure 1 is a vertical longitudinal section therethrough.

Figure 2 is a top plan view.

Figure 3 is a vertical transverse sectional view on the line 3—3 of Figure 2, parts in the distance being omitted for the sake of clarity.

Figure 4 is a vertical transverse sectional view on the line 4—4 of Figure 2, and.

Figure 5 is a perspective view of the reversing lever and its associated parts.

In the drawings, wherein for the purpose of illustration is shown a preferred embodiment of my invention, the numeral 1 designates a platform or top of a sled and 2 designates runners securely held to the platform 1 and spaced therefrom by a pair of front standards 3 and a pair of rear standards 4.

A pair of curved steering runners 5 are pivoted as at 6 to the forward ends of the main runners 2 and are curved upwardly and secured to the platform as at 7. Each of the steering runners 5 is reduced in thickness near its point of attachment to the platform 1 as shown at 8 to provide the necessary amount of flexibility for steering.

Each steering runner has a steering rod 9 secured thereto as at 10 and extended rearwardly on each side of the sled to within reach of the operator's feet. At the rear end each steering rod 9 is bent at a right angle to provide a foothold 11 for operation thereof. Supports 12 extend from each side of the platform 1 near its front end to slidably hold the steering rods 9 and the footholds 11 at the proper elevation.

The steering runners 5 are connected to each other and operated simultaneously for right or left hand turning by a bar 13.

A shaft 14 is mounted in the front standards 3 and supports the various mechanisms for propelling and stopping the sled, as will be hereinafter more fully described.

Pivotally mounted on the shaft 14 is a driving lever 15 having handles 16 conveniently arranged to be grasped by the hands of the operator.

A pivot element such as a bolt 17 passes through the driving lever 15 at a point above the shaft 14 and carries one of the forwardly driving propeller members 18. The other forwardly driving propeller member 19 is pivoted on the bolt 20' which passes through the driving lever 15 at a point below the shaft 14 thus providing for alternate power strokes when the upper end of the driving lever 15 is reciprocated.

The two propeller members 18 and 19 are held in engagement with the surface of the ice or snow over which the sled travels by means of springs 20 and 21 respectively. Hangers 22 are secured to the under side of the platform 1 and carry the shaft 23 to which one end of each of the springs 20 and 21 is secured. The opposite end of each spring bears on its respective propeller members as at 24 to perform its function as already described.

Rearwardly driving propellers similar to the ones already described are provided and consist of a propeller member 25 secured to the pivot element 17 and normally urged downwardly by a spring 26. The numeral 27 designates the other rearwardly driving propeller and the numeral 28 designates its holding spring. A pair of hangers 29 similar to the ones marked 22 are secured to the under side of the platform 1 adjacent the rearwardly driving propellers and carry a shaft 30 to which one end of each of the springs 26 and 28 is secured. The springs at their other ends bear downwardly on the propellers as at 31. Each of the propeller members is provided near its ground engaging end with enlargements 32 whereby a better hold can be obtained when traveling over soft snow.

A reversing mechanism indicated generally by the numeral 33 is pivotally mounted on the shaft 14 by means of a sleeve 34 and is operable in either a forward or backward movement by a lever 35 and held in such adjustment by a rack 36 and a pawl 37. The sleeve 34 carries an arm 38 which is provided with an extension 39 as shown in the drawings. A finger 40 is formed integral with the arm 38 and is adapted to engage with the under side of the forwardly driving propeller 18 to raise it out of engagement with the surface of the ice or snow at times. A similar finger 41 is formed with the extension 39 and cooperates with it in a similar manner.

An arm 42 extends from the sleeve 34 in an opposite direction from the arm 38 and carries a finger 43 for engagement with the rearwardly driving propeller 25 while an extension 44 of the arm 42 carries a finger 45 for engagement with the rearwardly driving propeller 27; thus it will be seen that the reversing mechanism cooperates with the forwardly and rearwardly driving propellers to raise one set of propellers out of engagement with the ice and to lower the other set into engagement therewith.

In order to check the motion of the sled a brake is provided and as shown it consists of an arm 46 one end of which is pivoted to the shaft 14 at 47 and carries a hand lever 48 within reach of the operator. Ground gripping claws are formed at the other end of the arm 46 and are adapted to come into contact with the ground when the lever 48 is moved in a rearward direction. A spring 50 is fastened at one end to the under side of the platform 1 and at the other end to the arm 46 to normally hold the gripping claws in an elevated position.

A seat 51 is mounted on the platform 1 a suitable distance from the driving lever 15 to enable an operator to assume a rowing position.

The device is shown and described as a sled but it is to be understood that wheels may be mounted on the runners, either permanently or adjustably for contact with the ground when the snow or ice has melted, without departing from the spirit of the invention.

An engine may also be secured to the platform 1 and connected by a pitman or other suitable means to the driving lever 15 to accomplish the same result as hand driving.

The operation of the device is as follows:
When it is desired to propel the sled in a forward direction the hand lever 35 is placed in the position as shown in the drawings. This position permits the ground engaging ends of the forwardly driving propellers 18 and 19 to contact with the ground or ice due to the fact that the fingers 40 and 41 of the reversing mechanism 33 have been lowered out of engagement with the said propellers 18 and 19. At the same time the fingers 43 and 45 of the reversing mechanism are raised into engagement with the rearwardly driving propellers to raise them out of contact with the ground.

The operator seated upon the seat 51 then rocks the lever 15 back and forth with a rowing action and power is transmitted to the propellers 18 and 19 through the pivot elements 17 and 20'. On the rearward stroke of the driving lever 15 the propeller 18 is in operation while on the forward stroke the propeller 19 contacts with the ice, thus providing a smooth and uninterrupted flow of power.

If it is desired to reverse the direction of movement of the sled the operator simply moves the lever 35 to its forward position, at which time the rearwardly driving propellers are caused to contact with the ground due to the lowering of the fingers 43 and 45 of the reversing mechanism 33. At the same time the reversing mechanism through the instrumentality of the fingers 40 and 41 raises the forwardly driving propellers to their inoperative position.

Steering is accomplished by the operator pressing his right or left foot against the desired foothold 11 of the steering rod 9 to guide the sled in either a right or left hand direction in a well-known manner.

When it is desired to stop the machine the operator pulls on the hand lever 48, thus lowering the arm 46 against the tension of the spring 50 to bring the gripping claws 49 into engagement with the ground, ice or snow, as is obvious.

It will be noted by reference to Figure 1 of the drawings that the lever 35 of the reversing mechanism 33 can be placed in a position intermediate to the forward and reverse and in this position both propellers will be out of engagement with the ground to prevent wear of the propellers while coasting.

Having thus described my invention, I claim:

1. In a sled, a pair of runners, standards secured to the runners, a shaft mounted in the standards, a driving lever pivoted on the shaft, a forwardly driving propeller pivoted to the driving lever, a rearwardly driving propeller pivoted to the driving lever, and means for selecting one of the propellers for contact with the ground and for raising the other propeller out of contact therewith at the same time.

2. A sled having a platform and runners, said platform being secured to the runners by standards, a driving lever supported in the standards, propellers pivoted to the said driving lever for forward and rearward motion and means for selecting either of the propellers.

3. A device of the class described, comprising a sled, a shaft mounted on the sled, a driving lever pivoted on the shaft, a forwardly driving propeller, a spring for normally urging the said propeller downwardly, a rearwardly driving propeller, a spring for normally urging the said rearwardly driving propeller downwardly, and means for raising either one of the propellers against the action of its spring.

4. A device of the class described, comprising a sled, a shaft mounted on the sled, a driving lever pivoted on the shaft, a forwardly driving propeller, a spring for normally urging the said propeller downwardly, a rearwardly driving propeller, a spring for normally urging the said rearwardly driving propeller downwardly, and means for raising both propellers off of the ground and against the action of their springs.

5. A device of the class described, comprising a sled, a shaft mounted on the sled, a driving lever pivoted on the shaft, a forwardly driving propeller, a spring for normally urging the said propeller downwardly, a rearwardly driving propeller, a spring for normally urging the said rearwardly driving propeller downwardly, and a reversing mechanism comprising a sleeve pivoted on the shaft with the driving lever and carrying arms provided with fingers for engaging the under side of each propeller to raise or lower them under the action of a hand lever.

6. In a device of the class described, the combination with a sled having runners, of a shaft mounted on the sled, a driving lever pivoted on the shaft, a forwardly driving propeller, a rearwardly driving propeller, a reversing mechanism for placing either propeller into operation, steering runners connected to the sled runners and operated by the feet of the operator, and a brake pivoted on the shaft with the driving lever and provided with a hand lever and ground gripping claws.

In testimony whereof I affix my signature.

JOHN JULIANO.